United States Patent [19]
Johnson

[11] Patent Number: 5,991,691
[45] Date of Patent: Nov. 23, 1999

[54] SYSTEM AND METHOD FOR DETERMINING HIGH ACCURACY RELATIVE POSITION SOLUTIONS BETWEEN TWO MOVING PLATFORMS

[75] Inventor: Gregory Bengt Johnson, West Jordan, Vt.

[73] Assignee: Raytheon Aircraft Corporation, Lexington, Mass.

[21] Appl. No.: 08/804,103

[22] Filed: Feb. 20, 1997

[51] Int. Cl.$^6$ ............................................. G01C 21/00
[52] U.S. Cl. ..................... 701/214; 701/207; 701/213; 701/14; 342/357
[58] Field of Search ............................ 701/200, 207, 701/213, 214, 215, 225, 14, 13, 15, 16, 17, 18; 342/357, 358; 455/12.1, 13.2

[56] References Cited

U.S. PATENT DOCUMENTS

| | | | |
|---|---|---|---|
| 5,442,363 | 8/1995 | Remondi | 342/357 |
| 5,450,448 | 9/1995 | Sheynblat | 342/358 |
| 5,451,964 | 9/1995 | Babu | 342/357 |
| 5,477,458 | 12/1995 | Loomis | 701/225 |
| 5,525,999 | 6/1996 | King et al. | 342/357 |
| 5,543,804 | 8/1996 | Buchler et al. | 342/357 |
| 5,600,329 | 2/1997 | Brenner | 701/14 |
| 5,825,326 | 10/1998 | Semler et al. | 701/207 |

*Primary Examiner*—William A. Cuchlinski, Jr.
*Assistant Examiner*—Arthur D. Donnelly
*Attorney, Agent, or Firm*—Arnold White & Durkee

[57] ABSTRACT

A system for determining high accuracy relative position solutions between two moving platforms is disclosed. This system is particularly suited for aircraft carrier approach and landing operations. More specifically, a system is disclosed that modifies existing Kinematic Carrier Phase Tracking (KCPT) solutions, which are useful for solutions between a moving platform and a fixed ground based platform, to provide an acceptable relative solution vector in aircraft carrier approach and landing operations, or other environments involving multiple moving platforms. The system disclosed provides a relative KCPT (RKCPT) process that achieves significant advantages over old KCPT process technology. To do so, the system utilizes multiple independent Kalman filters linked to multiple independent numerical ambiguity estimators to provide multiple sets of floating and fixed ambiguities for an accurate solution vector determination. In particular, three independent Kalman filters are disclosed, which are directed to the three highest elevation positioning space vehicles and which are linked respectively to three independent numerical ambiguity estimators. More particularly, the numerical ambiguity estimators may be Teunissen ambiguity estimators. The positioning space vehicles may be the current Global Positioning System satellites, and the system may focus on wide lane GPS data to limit the calculations conducted. An associated method for determining a relative solution vector between multiple moving platforms is also disclosed.

20 Claims, 9 Drawing Sheets

SYSTEM AND METHOD FOR DETERMINING HIGH ACCURACY RELATIVE POSITION SOLUTIONS BETWEEN TWO MOVING PLATFORMS

BACKGROUND OF THE INVENTION

1. Field of the Invention

The present invention relates to aircraft approach and landing systems for moving platforms. The present invention also relates to systems based on the Global Positioning System Kinematic Carrier Phase Tracking technology, and to systems that determine relative position solutions between two moving platforms.

2. Related Art

Landing an aircraft on a moving platform or landing area creates significant problems for approach and landing systems. For example, in naval applications such as landing an aircraft on an aircraft carrier, aircraft landing operations require a robust and precise navigation system for auto-coupled approaches and landings. A radar based system called the SPN-46 system has been previously developed to provide the required sensor accuracy for auto-coupled approaches for approach and landing control for an aircraft landing on an aircraft carrier. The SPN-46 system, however, tends not to be reliable during limited visibility conditions, such as those caused by precipitation, and it is in such limited visibility conditions that a system, such as the SPN-46, is most required.

Approach and landing systems, based upon the Global Positioning System, do not suffer from this disadvantage and are operable in bad weather. The Global Positioning System ("GPS") presently consists of a constellation of 24 satellites that continuously broadcasts time and frequency data on two frequencies, L1 and L2. GPS receivers have been developed to correlate these time and frequency measurements to develop range measurements. Using these range measurements and triangulating, a determination of the GPS receiver's position relative to a point on the earth may be determined. The most common method utilized is to determine a position relative to a known surveyed reference point that is fixed on the earth's surface. In the context of approach and landing of aircraft, this reference point is typically some stationary point on the ground near the landing area, such as a touchdown point for the aircraft. To implement a GPS landing system, algorithms have been developed that use GPS data to produce an accurate known position relative to a surveyed aircraft touchdown point. One such algorithm is known as a Kinematic Carrier Phase Tracking (KCPT) solution.

For aircraft carrier landing systems, however, the landing area is not stationary, and there is no surveyed touchdown point. In addition, Navy requirements specify that the aircraft position must be known relative to the touchdown point on the aircraft carrier to an accuracy of one foot. Because the touchdown point on an aircraft carrier is constantly changing, along with other environmental aspects of the aircraft carrier that are hostile to the KCPT solution, existing KCPT solutions do not provide adequate results in an aircraft carrier application. In addition, to operate a KCPT solution on an aircraft carrier, the process must be able to accommodate multiple maskings and cycle slips on a moving platform.

In other applications involving the tracking of one moving object with respect to another moving object, similar problems are encountered with traditional systems relying upon GPS technology. Because there is no surveyed point to use as a reference, the range and direction solutions are difficult to determine.

What is needed is a system for determining an accurate relative solution vector for environments between two moving platforms, such as in aircraft carrier approach and landing operations.

SUMMARY OF THE INVENTION

The present invention provides a highly accurate relative position solution vector for determining range and direction between two moving platforms, which is particularly suited to aircraft carrier approach and landing operations. More specifically, the present invention contemplates a modification to existing KCPT solutions to provide an acceptable position solution in aircraft carrier approach and landing operations, or other environments involving multiple moving platforms. The present invention provides a relative KCPT (RKCPT) process that achieves significant advantages over old KCPT process technology in two moving platform environments.

One embodiment according to the present invention is a system for determining a relative solution vector between multiple moving platforms. This system may include a first moving platform having a first Global Position System (GPS) receiver, a second moving platform having a second GPS receiver, and a double differencing processor communicating with the first GPS receiver and the second GPS receiver to determine double differenced pseudorange and carrier phase calculations. To resolve floating ambiguities, the system may have a plurality of independent Kalman filters generating a plurality of independent sets of floating ambiguities, with each of the independent Kalman filters utilizing a different GPS satellite as a target. To resolve fixed ambiguities, the system may have a plurality of independent numerical ambiguity estimators that are correlated to the plurality of Kalman filters. Finally, the system may have a position solution processor communicating with the independent Kalman filters, the numerical ambiguity estimators, and the double differencing processor to determine a relative solution vector between the two moving platforms.

In a further embodiment, the first moving platform may be an aircraft carrier, and the second moving platform may be an aircraft. In addition, the independent numerical ambiguity estimators may be Teunissen ambiguity estimators, and there may be three independent Kalman filters and three Teunissen ambiguity estimators.

Another embodiment of the present invention is a system for determining a relative solution vector for aircraft carrier approach and landing operations. This system may include a first antenna located on an aircraft carrier constructed to receive transmissions from positioning space vehicles; a second antenna located on an aircraft constructed to receive transmissions from positioning space vehicles; and a double differencing processor communicating with the first and second antennas to receive pseudorange measurements and carrier phase measurements with respect to a plurality of positioning space vehicles, such as Global Positioning System satellites. The system may also include a plurality of independent Kalman filters utilizing different target positioning space vehicles and communicating with the double differencing processor to determine independent sets of floating ambiguities. Correlating to the Kalman filters, a plurality of independent numerical ambiguity estimators may also be provided in the system to determine independent sets of fixed ambiguities. Also, the system may have a position solution processor communicating with the Kalman filters, the numerical ambiguity estimators, and the double differencing processor to determine a relative solution vector between the aircraft and the aircraft carrier. In a more particular embodiment, there may be three Kalman filters and three correlating numerical ambiguity estimators, with the numerical ambiguity estimators being Teunissen ambiguity estimators. Furthermore, the three independent Kalman filters may utilize the three highest elevation GPS satellites as target GPS satellites.

A further embodiment of the present invention is a system for determining a position solution for aircraft carrier approach and landing operations that is located on an aircraft. This aircraft system may include an antenna constructed to receive transmissions from positioning space vehicles; a receiver constructed to communicate with a remote transmitter to receive positioning information with respect to the positioning space vehicles and a remote platform; and a double differencing processor. The aircraft system may also have a plurality of independent Kalman filters utilizing different target positioning space vehicles to determine floating ambiguities; a plurality of independent numerical ambiguity estimators correlated to the Kalman filters to determine fixed ambiguities; and a position solution processor communicating with the Kalman filters, the numerical ambiguity estimators, and the double differencing processor to determine a relative solution vector between the aircraft and the remote platform.

Another embodiment of the present invention is a corresponding method for determining a relative solution vector between multiple moving platforms. This method may include the steps of making pseudorange and carrier phase measurements with respect to a plurality of visible positioning space vehicles and a first moving platform; making pseudorange and carrier phase measurements with respect to a plurality of visible positioning space vehicles and a second moving platform; making double difference pseudorange and carrier phase calculations from the pseudorange and carrier phase measurements; resolving floating ambiguities utilizing a plurality of independent Kalman filters; resolving fixed ambiguities utilizing a plurality of Teunissen numerical ambiguity estimators correlated to the Kalman filters; and determining a final relative solution vector between the first platform and the second moving platform. More specifically, the positioning space vehicles may be GPS satellites, and the first and second moving platforms may be an aircraft carrier and an aircraft. Further, the method may also include a step of determining an intermediate relative solution vector.

In a further embodiment, the step of resolving floating ambiguities may be accomplished by resolving floating ambiguities with a first Kalman filter that utilizes a highest elevation visible positioning space vehicle as a target; resolving floating ambiguities with a second Kalman filter that utilizes a second highest elevation visible positioning space vehicle as a target; resolving floating ambiguities with a third Kalman filter that utilizes a third highest elevation visible positioning space vehicle as a target; and selecting resolved floating ambiguities from the first Kalman filter if the first Kalman filter carrier phase measurements have a positive phase lock, from the second Kalman filter if the first Kalman filter carrier phase measurements do not have a positive phase lock, and from the third Kalman filter if the first and second Kalman filter carrier phase measurements do not have a positive phase lock.

BRIEF DESCRIPTION OF THE DRAWINGS

It is to be noted that the appended drawings illustrate only particular embodiments of the invention and are, therefore, not to be considered limiting of its scope, for the invention may admit to other effective embodiments.

DETAILED DESCRIPTION OF ILLUSTRATIVE EMBODIMENTS

The present invention provides accurate range and direction solutions between two moving platforms. More particularly, the present invention utilizes multiple Kalman filters and Teunissen ambiguity estimators to modify existing Kinematic Carrier Phase Tracking (KCPT) technology to provide accurate solutions with a moving ground platform. The present invention is particularly advantageous in providing position solutions for Navy aircraft carrier approach and landing operations.

Figure 1:
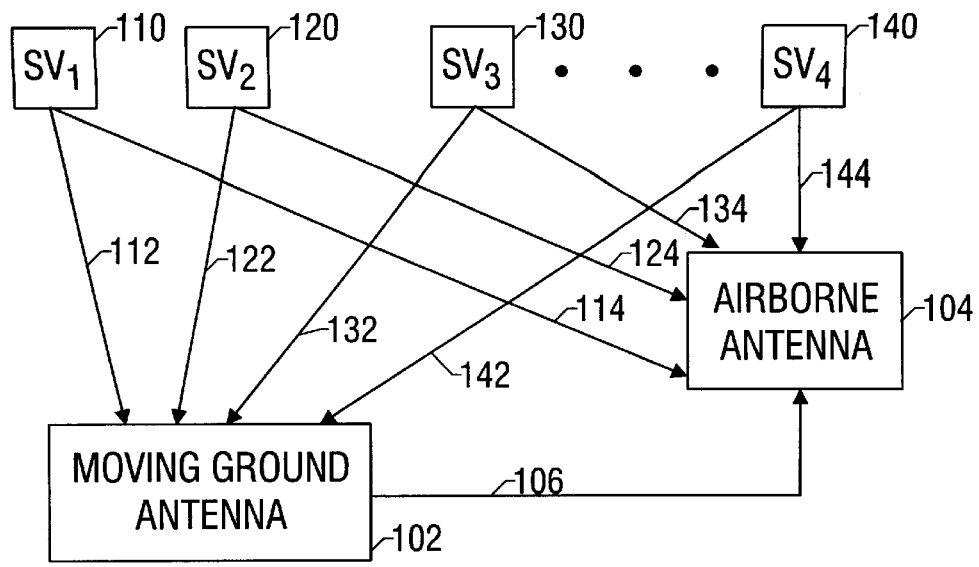
FIG. 1 is a block diagram depicting an example environment in which the present invention is utilized.

FIG. 1 is a block diagram of an environment in which the present invention provides an advantageous accurate solution. Such an environment may include a moving ground antenna 102, such as a GPS receiver on an aircraft carrier, and an airborne antenna 104, such as a GPS receiver on an aircraft. At any one time, only some of the satellites of the Global Positioning System will be visible to an airborne or ground GPS receiver. In FIG. 1, the visible satellites are space vehicles (SVs) 110, 120, 130 and 140, which are labeled $SV_1$, $SV_2$, $SV_3$ . . . $SV_n$. The visible SVs will transmit position information to the moving ground antenna, which is shown in FIG. 1 by lines 112, 122, 132 and 142. Similarly the SVs will transmit position information to the airborne antenna, which is shown in FIG. 1 by lines 114, 124, 134 and 144.

The constant motion of the SVs and the motion of the platforms dictate that the GPS receiver must be able to track the change in frequency, or Doppler shift, of the SV transmissions. Integration of the Doppler shift over time yields a highly accurate delta range measurement which is proportional to the advance in signal-carrier phase between two time epochs. Such techniques may provide a range measurement to an accuracy of a about one-tenth of the wavelength of the transmission frequency. Current GPS transmissions occur at two wavelengths, L1 and L2. The wavelength of L1 is approximately 19 cm, while the wavelength of L2 is approximately 24 cm. Thus, the integrated Doppler techniques achieve and a delta-range accuracy of approximately 1–3 cm.

The true range between the SV and the GPS receiver, however, cannot be determined by integrated Doppler techniques alone because the constant of integration of the Doppler shift is ambiguous. These ambiguities must be resolved to provide a highly accurate range solution.

Figure 2:
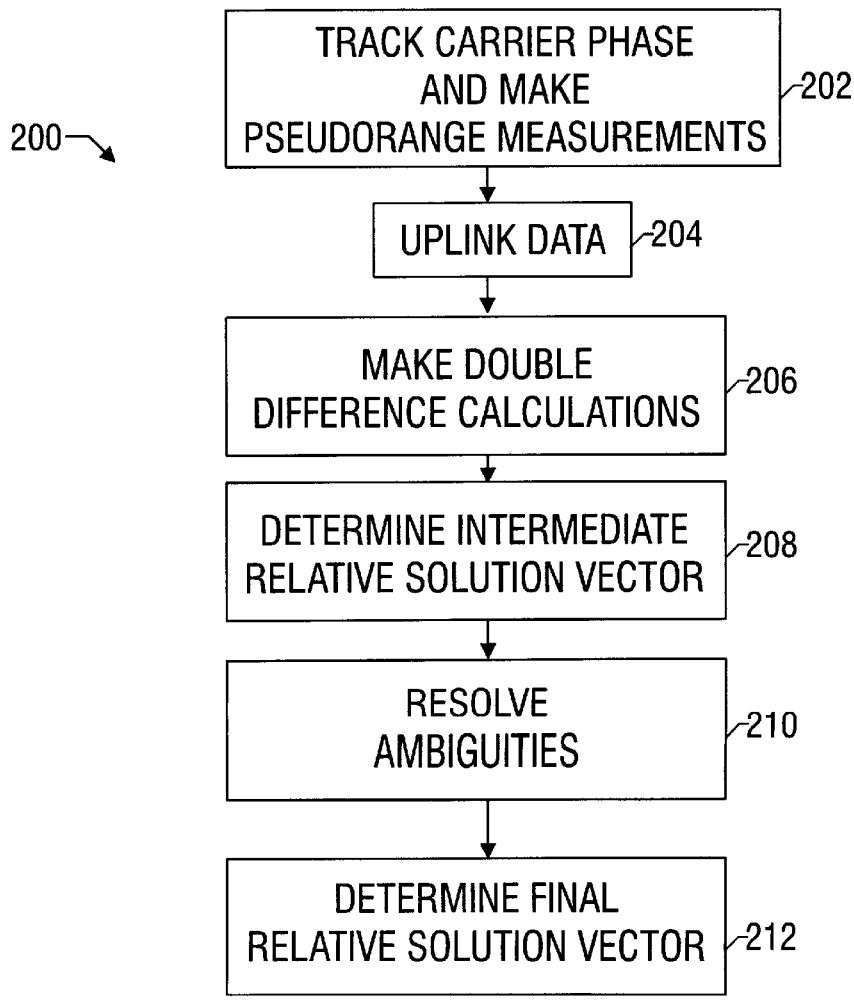
FIG. 2 is a general flow chart of a process implementing the present invention.

FIG. 2 depicts a flow chart for a general technique for implementing integrated Doppler techniques. The interferometric concept of using integrated Doppler to resolve a relative vector between two antennas has been known previously and is referred to as a Kinematic Carrier Phase Tracking (KCPT) solution. The implementation of the modified KCPT solution contemplated by the present invention involves six general steps as shown in FIG. 2. In step 202, the ground based GPS receiver and the airborne GPS receiver tracks the carrier phase advance of the SV carrier signal by making raw carrier phase measurements and pseudorange measurements. In step 204, the ground based system transmits its raw carrier phase and pseudorange measurement data through a transmitter to a receiver on the airborne GPS receiver system. In step 206, the airborne system performs a double differencing calculation on all of the raw carrier phase and pseudorange measurements. In step 208, the airborne system solves for an intermediate relative solution vector between the ground antenna and airborne antenna, using double differenced measurements. In step 210, the airborne system resolves carrier phase and numerical ambiguities. Finally in step 212, the airborne system calculates a high accuracy relative solution vector between the air and ground antennas utilizing double differencing calculations, the intermediate relative solution vector, and resolved floating and fixed ambiguities.

It is noted, however, that although the uplink of raw data from the ground system to the airborne system occurs in step 204 as depicted in FIG. 2, data could be transmitted from the airborne system to the ground system in alternative embodiments, and the calculations may be done by the ground system or the airborne system. Thus, various modifications to the systems may be made and still process the data to achieve an accurate relative solution vector between two moving platforms.

Figure 3:
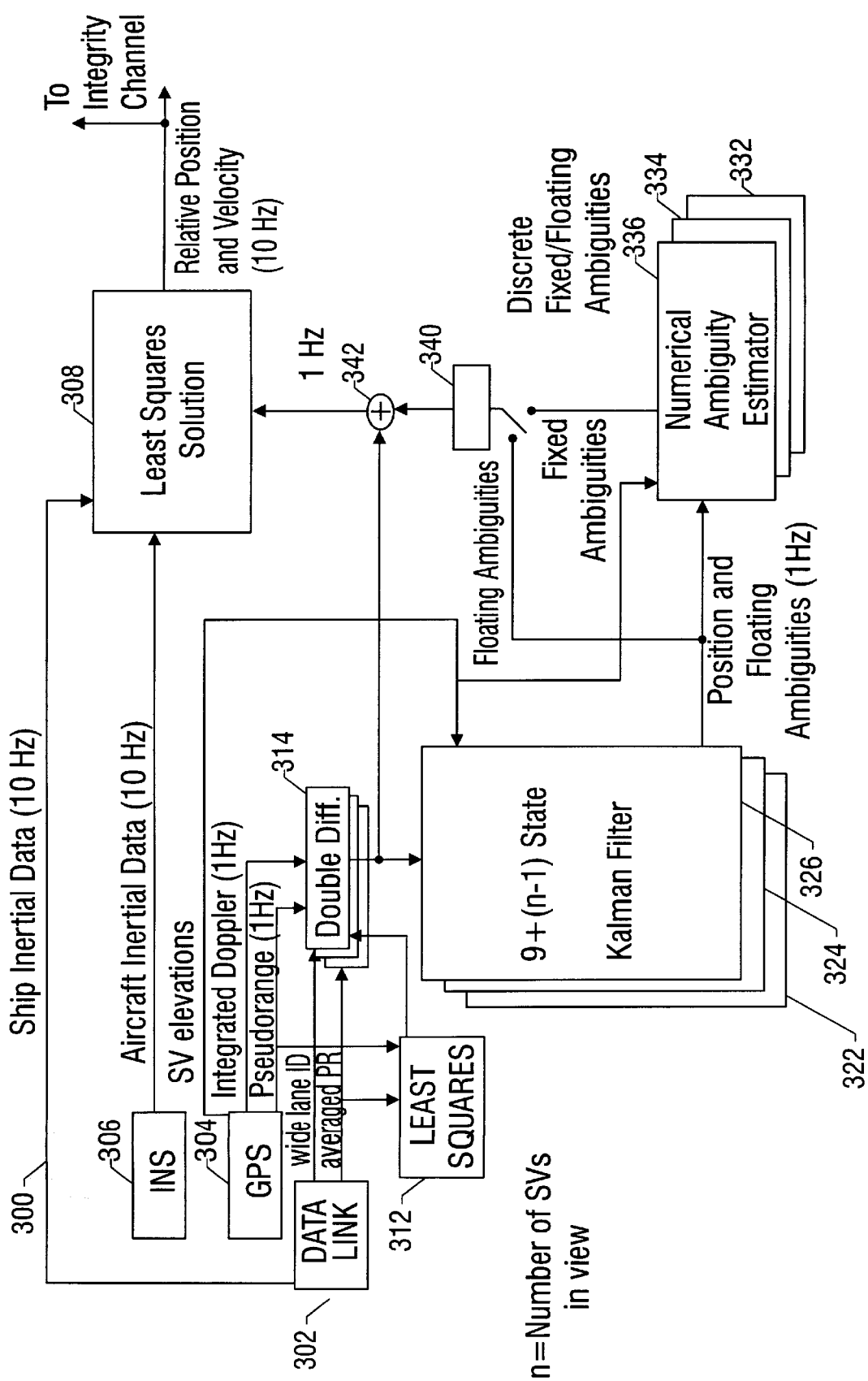
FIG. 3 is a block diagram of an embodiment of the present invention.

FIG. 3 is a block diagram of an embodiment 300 of the present invention which determines accurate range and direction solutions for approach and landing operations involving two moving platforms, implementing the process steps depicted in FIG. 2. The processing blocks in the embodiment depicted in FIG. 3 occur within the computer systems on the airborne platform, and may be programmed using various programming languages including C++ and MATLAB programming languages.

Data from the ground platform is provided through data link 302, and includes wide lane integrated Doppler (ID) data and averaged pseudorange (PR) data. This ground based data is provided to double differencing processor block 314. Block 314 also receives airborne data in the form of ID (1 Hz) data, pseudorange (1 Hz) data, and SV elevation data from GPS receiver block 304. The averaged PR data from data link 302 and PR data from GPS receiver block 304 are also subjected to least squares (LS) processor block 312, and then provided to double differencing processor block 314. Finally, double differencing processor block 314 receives data regarding the difference in ground and air clock bias.

Kalman filters 322, 324 and 326 are independent and receive information from double differencing processor block 314, as well as SV elevation data and PR data from GPS receiver block 304. The Kalman filters 322, 324 and 326 are each 9+(n−1) state Kalman filters, where "n" is the number of SVs in view.

Numerical ambiguity estimators 332, 334 and 336 receive SV elevation data from GPS receiver block 304, and receive position and floating ambiguity data (1 Hz) from Kalman filters 322, 324 and 326. The numerical ambiguity estimators 332, 334 and 336 provide discrete fixed and floating point ambiguities to selection block 340, with three independent sets of fixed ambiguities coming from the three ambiguity estimators 332, 334 and 336, and three independent sets of floating ambiguities coming from the Kalman filters 322, 324 and 326. It is noted that although three Kalman filters and three numerical ambiguity estimators are depicted in FIG. 3, various multiple (i.e., 2 or more) ones may be used.

Processing block 342 receives double difference data from double differencing processor block 314 and the ambiguity data from selection block 340.

Least squares solution block 308 receives output data (1 Hz) from processing block 342 and body acceleration and rotation rates (10 Hz) from the aircraft inertial instruments (INS) 306 and from the ship inertial instruments through data link 302. The GPS receiver block 304 provides data to the aircraft inertial instruments 306. The least squares solution block 308 provides a highly accurate relative position and velocity (10 Hz) solution that is utilized by the aircraft in approach and landing operations. The integrity of this solution may also checked by sending the output to an integrity channel. It is noted that a highly accurate position solution may be provided as a 1 Hz solution in the embodiment 300 depicted in FIG. 3 without utilizing the ship and aircraft 10 Hz intertial data to provide a 10 Hz solution. It is further noted that the present invention may be modified to provide other solutions at other rates.

The aircraft carrier environment has before now not been conducive to KCPT operations. This is so because the mounting requirements and the radio-frequency environment causes multiple SV maskings and carrier phase cycle slips. When an SV masking or cycle slip occurs, the carrier phase looses lock and that ambiguity must be re-estimated. The present invention, as depicted in FIG. 3, overcomes this problem by utilizing multiple independent Kalman filters 322, 324 and 326, which are each linked to a respective independent numerical ambiguity estimator 332, 334 or 336, to generate multiple independent sets of floating point ambiguities linked to multiple independent sets of fixed ambiguities. In this way, the present invention provides a significant improvement in resolving ambiguities that allows KCPT technology to be utilized in a multiple moving platform environment.

Carrier Phase Tracking and Pseudorange Measurements

To make pseudorange measurements in step 202, the GPS receivers associated with the airborne antenna 104 and the moving ground antenna 102 receive and decode position information from visible GPS satellites. This position information is generally referred as "pseudorange" information. For this position information to become accurate, multiple GPS satellites must be visible, and the pseudorange information must be processed. One technique for processing this information is to triangulate information from three GPS satellites to determine an error correction using differential GPS techniques. In contrast to differential GPS techniques, the present invention contemplates processing the pseudorange measurements using double differencing techniques as discussed below.

To track the carrier phase in step 202, once a receiver channel locks on to a carrier signal from a single SV, the channel keeps a running count of the cycles based on the Doppler shift present on L1 and L2. This is done by integrating the Doppler shift over the interval of the epoch. At the conclusion of each epoch, the estimate of the carrier phase count of that epoch is added to the count of the previous epoch to keep a running total of the number of carrier phase cycles. As long as the receiver keeps lock on the carrier, the delta-range measurement is extremely accurate. However, the receiver must begin to count or integrate at some point. When the receiver begins this count, or if the receiver loses lock on the carrier, it has no knowledge of the previous Doppler shift count, so it must begin the count at some arbitrary whole number. This whole number is ambiguous, and must be resolved to obtain an accurate position fix using carrier phase measurements.

The goal for the traditional KCPT process is to track L1 frequencies and resolve L1 ambiguities. However, L1 ambiguities are difficult to resolve because of the small L1 wavelength. Differencing L1 and L2 carrier phase measurements will produce a wide lane wavelength of 86 centimeters. The penalty for using the wide lane measurement is that the noise level is increased over the L1 measurement by a factor of six. Although high accuracy is obtained when the L1 carrier cycle is used, the wide lane measurement proves to be a very effective intermediate step in resolving L1 ambiguities. ASHTECH Z-12 receivers have proven effective in tracking L1 and L2 carrier phases without carrier phase cycle slips that adversely effect operations. These receivers employ a Z-Code tracking capability that provides high quality code and carrier phase measurements on both L1 and L2 frequencies.

Uplinking Data Concerning the Moving Ground Platform

In step 204, unlike differential GPS solutions which uplink error correction information, the present invention uplinks the raw pseudorange measurement and carrier phase data. The majority of the processing, therefore, is accomplished in the airborne receiver. For traditional KCPT implementations, both L1 and L2 carrier phase information is uplinked to calculate both wide lane and L1 solutions. With the present modified RKCPT solution, however, only the wide lane information is preferably uplinked to limit the data transferred and the calculations conducted.

Making Double Differencing Calculations

In step 206, the performance of a double differencing calculation on the raw carrier phase measurements accomplishes two tasks. First, this calculation processes the range measurements so that they may be readily applied to a relative vector solution. Second, it cancels out most of the sources for systematic errors. This calculation is important because KCPT solutions solve for a relative vector between the ground and airborne antennas. This relative vector, however, cannot use raw range measurements because the range measurements will converge to an absolute position solution. Therefore, the range measurements of the same SV must be differenced between the two receivers to obtain the difference in range measurements.

Figure 4:
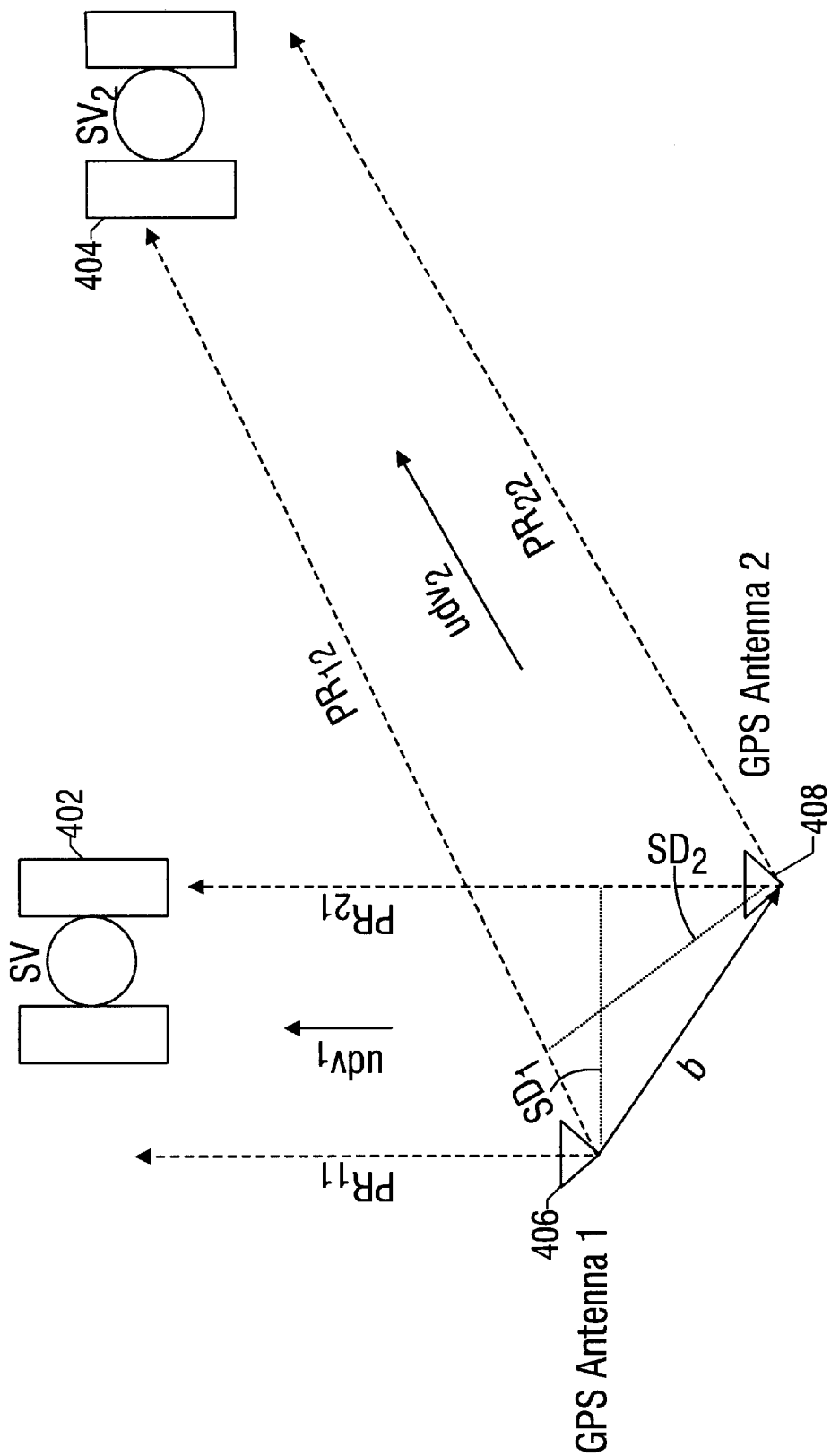
FIG. 4 is a block diagram depicting measurements made by an embodiment of the present invention.

Referring to FIG. 4, a block diagram is shown of various measurements for the double differencing calculation. In particular, measurements are made from GPS Antenna 1 on platform 406, which may for example correlate to a moving ground antenna 102 on an aircraft carrier, and GPS Antenna 2 on platform 408, which may for example correlate to a airborne antenna 104 on an aircraft. FIG. 4 also depicts two visible SVs, $SV_1$ 402 and $SV_2$ 404. Pseudorange measurements are made from each platform 406 and 408 to each SV 402 and 404.

In determining the double-difference calculation, a single difference calculation is first made for each visible SV. For example, for $SV_1$ the two pseudorange measurements $PR_{11}$ and $PR_{21}$ are differenced. The resulting vector between the platform 406 and platform 408 is designated by the vector b in FIG. 4. By differencing the pseudorange measurement, the result is the scalar $SD_1$, which is the dot product of the baseline vector b and the unit direction vector $udv_1$. In the traditional KCPT technique, the unit direction vector $udv_1$ is calculated between the base antenna position, which is known, and SV position, which is also known. The unit direction vector $udv_1$ is assumed equal for the two GPS receivers on platforms 406 and 408 because the difference in unit vectors from the ground platform 406 to an SV and the airborne platform 408 to the same SV is negligible due to the distances involved. This single difference calculation is helpful because it cancels out common errors between the base platform and the airborne platform caused by the SV, government introduced Selective Availability (SA), and most of the atmospheric errors This single difference is also performed for all other SVs in view. For example, in FIG. 4, pseudorange measurements are also made for GPS Antenna 1 on platform 406 to $SV_2$ 404, and for GPS Antenna 2 on platform 408 to $SV_2$ 404. The two pseudorange measurements $PR_{12}$ and $PR_{22}$ are then differenced. By differencing the pseudorange measurements, the result is the scalar $SD_2$, which is the dot product of the baseline vector b and the unit direction vector $udv_2$.

The double difference calculation may then be performed by differencing the single difference calculations for the target SV against all other SVs in view. The target SV is typically chosen as the highest elevation SV for two reasons. First, the highest elevation SV usually yields the best geometry. Second, the highest elevation SV will remain in view the longest, thus assuring that the target SV will not have to be switched for visibility reasons during an approach.

The advantage of performing the double difference calculation is that clock errors in the GPS receivers will cancel out. Referring again to FIG. 4, for example, it can be seen that the double difference is the dot product of true relative vector b with the difference of the two unit direction vectors $udv_1$ and $udv_2$. In the case of pseudorange measurements, the double difference calculation yields a relative range measurement with no ambiguities, but significantly larger noise. In contrast, the carrier phase double difference measurement yields a low noise relative range measurement with double difference ambiguities.

For the RKCPT solution of the present invention, the position of the base antenna on platform 406 is not known. The unit direction vectors, therefore, may be calculated by an iterative least squares method. The ground unit direction vectors are calculated and averaged with the airborne unit direction vector. Also the aircraft may also compensate for delay in the uplinked single difference wide lane data. This is accomplished by calculating the difference between the target SV and all other SVs before the difference between the base measurements and air measurements. This differences out the clock data first so that rate information can be calculated for the uplinked measurements. The uplinked measurements are then extrapolated to the current time.

Figure 5:
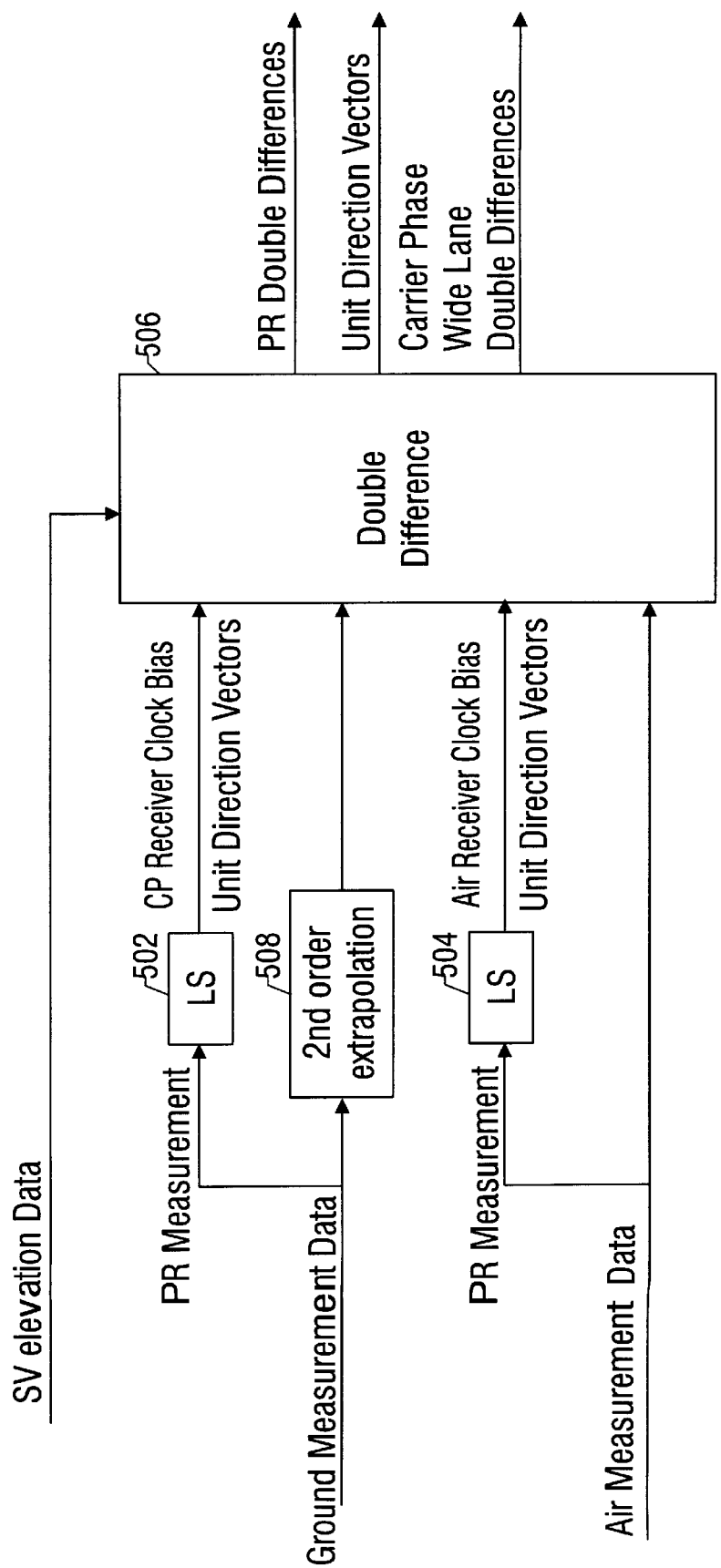
FIG. 5 is a block diagram of a double difference calculation conducted by an embodiment of the present invention.

Referring to FIG. 5, a block diagram is shown for performing the iterative least squares (LS) method and the double difference calculation. Pseudorange (PR) measurements from the ground measurement data is processed by iterative least squares process 502, and PR measurements from air measurement data is processed by iterative least squares process 504. The double differencing processor 506 receives: carrier phase (CP) receiver clock bias data and unit direction vectors from LS processor 502, ground measurement data that has been processed by 2nd order extrapolation block 508, CP receiver clock bias data and unit direction vectors from LS processor 504, air measurement data, and SV elevation data. The double differencing processor 506 then provides as an output: PR double difference calculations, unit direction vectors, and CP wide line double difference calculations.

Determining an Intermediate Relative Solution Vector

In step 208, an intermediate relative solution vector is determined utilizing the double difference calculations based on carrier phase measurements. Because carrier phase ambiguities are still ambiguous, a final relative solution vector is not possible until the ambiguities are calculated. An initial estimate of the integer ambiguities, however, may be performed by comparing the double differenced carrier phase measurements with the double differenced pseudorange measurements to obtain an "intermediate" relative solution vector.

Figure 6:
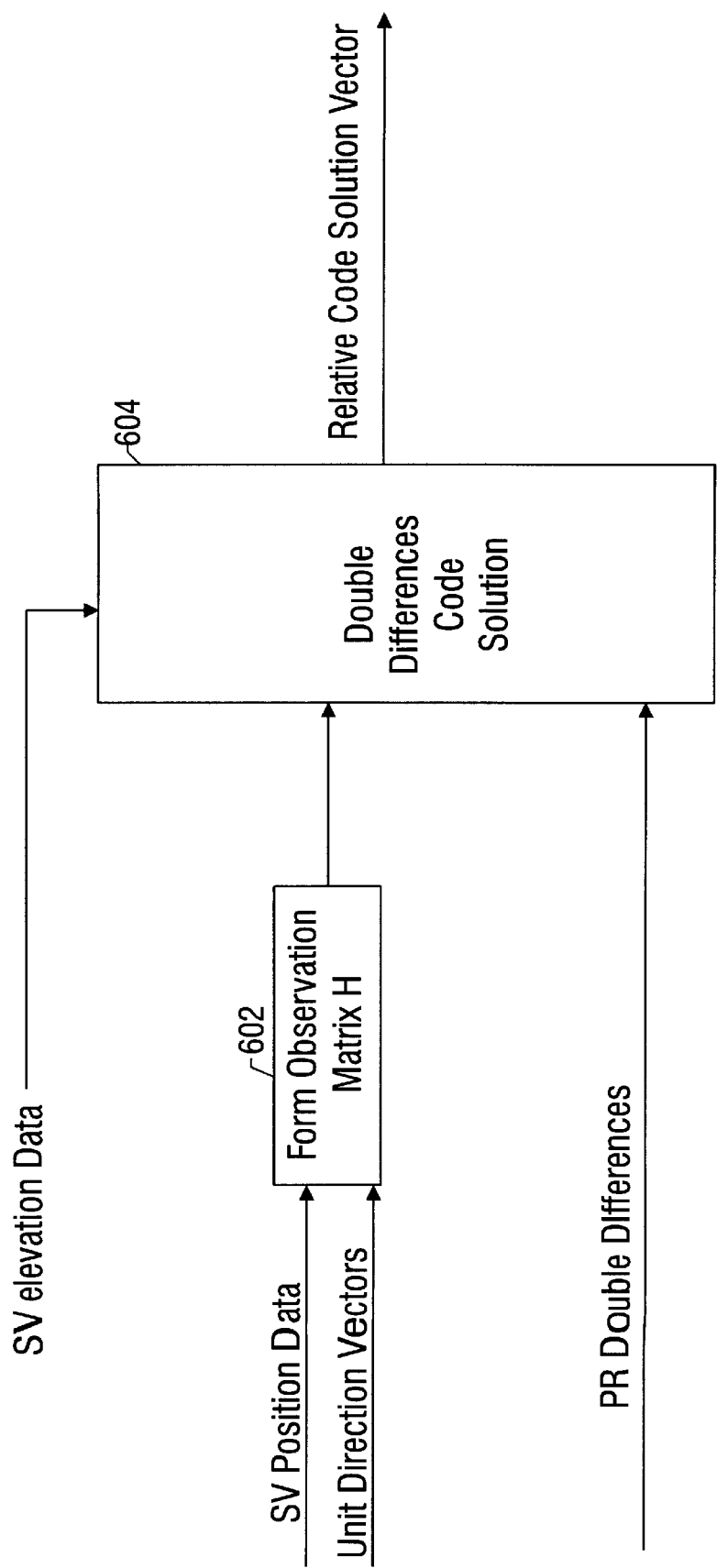
FIG. 6 is a block diagram of a double difference code solution conducted by an embodiment of the present invention.

An estimate of this integer ambiguity can be made by Equation 1. Because a typical smoothed PR measurement double difference error has a 3σ value of 2 meters, and the L1 wavelength is 19 cm. The integer ambiguity may, therefore, be ±11 wavelengths in error.

$$N_1 = \frac{dd_{pr12} - dd_{cp12}}{\lambda} \quad (1)$$

where:

$N_I$=initial estimate of double difference integer ambiguity $dd_{pr}$=pseudorange double difference between $SV_1$ and $SV_2$ $dd_{cp}$=carrier phase double difference between $SV_1$ and $SV_2$ λ=wavelength The pseudorange double difference calculation may also be used to calculate an "intermediate" relative code solution vector as shown in FIG. 6. The double difference code solution block 604 receives PR double difference calculations, as well as information from processing block 602, including the form observation matrix H, which is a matrix of the unit direction vectors as shown in Equation 2 below with the "u" designations. The processing block 602 receives SV elevation data, SV position data, and unit direction vectors. The double difference code solution block 604 provides a relative code solution vector as an output This "intermediate" solution vector is advantageous because it may serve as a backup to the carrier phase solution if carrier phase measurements are not available. The double difference code solution may also configure the algorithms to evolve into a KCPT solution. By solving for the vector b in Equation 2, an estimate of the relative vector that meets Navy Category I accuracy specifications may be produced.

$$\begin{bmatrix} dd_{pr12} \\ dd_{pr13} \\ \vdots \\ dd_{prln} \end{bmatrix} = \begin{bmatrix} u_{12x}u_{12y}u_{12z} \\ u_{13x}u_{13y}u_{13z} \\ \vdots \\ u_{1nx}u_{1ny}u_{1nz} \end{bmatrix} \begin{bmatrix} b_x \\ b_y \\ b_z \end{bmatrix} \quad (2)$$

where $u_{ij}$=difference between unit vectors of $SV_i$ and $SV_j$ n=number of SVs used in the solution The present invention utilizes these equations, which have been previously used in KCPT solutions, to obtain an intermediate relative solution vector. The present invention provides significant advantages over previous solutions in the resolution of ambiguities as discussed below.

Resolve Carrier Phase and Numerical Ambiguities

L1 carrier phase measurements are highly accurate measurements that may provide a relative position solution to centimeter level accuracy. To accomplish this, the double difference ambiguities must be resolved. Equation 2 above may be expanded in Equation 3 below to include double difference ambiguities.

$$\begin{bmatrix} dd_{cp12} \\ dd_{cp13} \\ \vdots \\ dd_{cpln} \end{bmatrix} = \begin{bmatrix} u_{12x}u_{12y}u_{12z} \\ u_{13x}u_{13y}u_{13z} \\ \vdots \\ u_{1nx}u_{1ny}u_{1nz} \end{bmatrix} \begin{bmatrix} b_x \\ b_y \\ b_z \end{bmatrix} + \begin{bmatrix} N_{12} \\ N_{13} \\ \vdots \\ n_{1n} \end{bmatrix}_I \quad (3)$$

where $N_{ij}$=initial estimate of double difference integer ambiguity between $SV_i$ and $SV_j$ $dd_{cpij}$=carrier phase double difference between $SV_i$ and $SV_j$ I=initial ambiguity estimate This resolution process, however, is first initialized with the ambiguities estimated in Equation 1. Once the ambiguities have been initialized, they may be in error by ±11 wavelengths. This yields $23^n$ possible combinations, creating ambiguities that must be resolved for an accurate final solution. Three methods for resolving these ambiguities are: (1) to implement numerical search algorithms to resolve the ambiguities, (2) to implement ground based carrier phase measurement to force a high rate of change of geometry, and (3) to utilize a Kalman filter to estimate the ambiguities and the covariance of ambiguities.

The first of these methods to resolve carrier phase ambiguities is a numerical method using an algorithm search methodology that tries different combinations of ambiguities and examines the residuals. This method is investigated in a doctorate dissertation by David Diggle entitled "*An Investigation into the Use of Satellite-Based Positioning Systems for Flight Reference/Autoland Operations*" (College of Engineering and Technology, Ohio University, March 1994). In this method, residuals near to zero are identified and kept as a candidate ambiguity set. This process is repeated epoch by epoch until the correct ambiguity set has been identified. The candidate ambiguity search volume may also be reduced by first using wide lane ambiguities as an intermediate step to resolving L1 carrier phase ambiguities. Because the wide lane wavelength is 86 cm, the search is reduced to ±3 wavelengths instead of ±11 wavelengths. The number of SVs searched, however, must be limited because of the numerous possibilities. Once wide lane ambiguities have been resolved, the transition to L1 ambiguities is then possible. This numerical solution requires 5 SVs to resolve ambiguities and to provide a solution with the required integrity. Cycle slip detection is also made easier in a dual frequency environment because one cycle slip in L1 and L2 represents specific range values. By comparing the derivative of L1 carrier phase measurements to the derivative L2 carrier phase measurements, any significant difference indicates a cycle slip.

The second method of resolving ambiguities is to provide ground based carrier phase measurements that the aircraft will be required to fly over. With this fast changing geometry, the ambiguities become readily observable, and the extensive search algorithms required for the numerical method are not required. Such a solution is discussed in the following article: C. E. Cohen, D. G. Lawrence, H. S. Cobb, B. S. Pervan, J. D. Powell and B. W. Parkinson of Stanford University; G. J. Aubrey, W. Loewe of United Airlines; D. Ormiston of Boeing CAG; B. D. McNally, D. N. Kaufinan of NASA Ames Research Center; V. Wullschleger of FAA Technical Center; R. Swider of FAA, *Preliminary Results of Category III Precision Landing With* 110 *Automatic Landings of a United Boeing* 737 *Using GNSS Integrity Beacons*, Proceedings of the ION National Technical Meeting, Anaheim, Calif., Jan. 18–20, 1995.

The third method for resolving ambiguities, which is preferred for the present invention, employs a Kalman filter to estimate the ambiguities. A Kalman filter uses differences in pseudorange and carrier phase double difference measurements, as well as aircraft dynamics, to converge on the ambiguities. A significant benefit to this method is that a low noise and accurate code "intermediate" solution, known as the float solution, may be determined and used while the system is resolving ambiguities. A disadvantage of this method, however, is that a Kalman filter alone is not as reliable as the numerical method. This is so because a Kalman filter only calculates the difference between the pseudorange and carrier phase measurements. Other errors caused by atmospheric errors and geometry are seen by the Kalman filter as part of the ambiguity.

To correct for these other errors, a Kalman filter may be augmented by a method that optimizes the three dimensional geometry of a position solution into the geometry of the current SV constellation. One geometry optimization method is known as the Teunissen method, as described in the following article: P. J. G. Teunissen, *A New Method for Fast Carrier Phase Ambiguity Estimation*, I.E.E.E. 0-7803-1435 Plans 94 Proceedings (February 1994).

As depicted the embodiment shown in FIG. 3, the present invention may utilize three independent Kalman filters 322, 324 and 326 along with three linked numerical ambiguity estimators 332, 334 and 336, which may be Teunissen ambiguity estimators. By implementing these multiple linked processing units, the present invention provides the first KCPT based process able to operate in aircraft carrier approach and landing operations, or other multiple moving platform environments.

The present invention achieves these advantageous results in how the final KCPT solution and ambiguity estimators are integrated. This integration employs two separate processes. First, the Kalman filters run independent from the final solution calculation, and continuously calculate the ambiguities in floating point format. If a cycle slip occurs, the Kalman filter simply rests that particular state in which the cycle slip occurred. Second, the Kalman is able to assimilate constellation changes. The Kalman states are formed each epoch, and the Kalman filters do not assume any consistency in constellation, except for the highest elevation SV.

Figure 7:
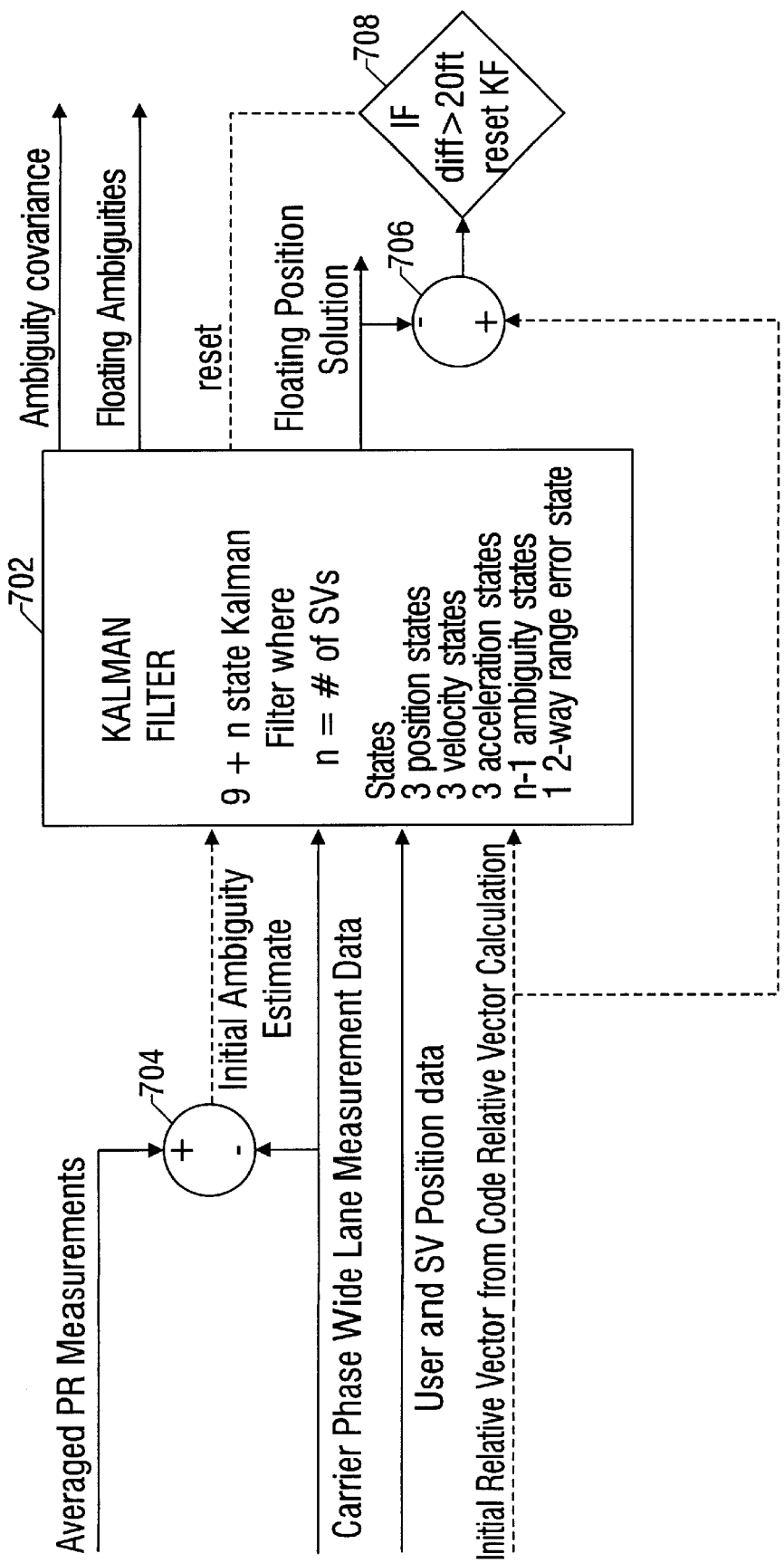
FIG. 7 is a block diagram of a Kalman filter utilized by an embodiment of the present invention.

Referring to FIG. 7, a block diagram of Kalman filter processing is shown. Kalman filter 702 may be a 9+n state Kalman filter, where "n" is the number of SVs in view. The states may be as follows: 3 position states, 3 velocity states, 3 acceleration states, n−1 ambiguity states, and 1 two-way range error state. The Kalman filter 702 receives carrier phase wide lane measurement data, ground and SV position data, and initial relative vector from the code relative vector calculation. The Kalman filter also receives an initial ambiguity estimate, which is determined by differential block 704 from averaged PR measurement data and carrier phase wide lane measurement data. Kalman filter 702 outputs an ambiguity covariance, floating ambiguities, and a floating position solution. Differential block 706 receives the floating position solution and the initial relative vector and provides a comparison to decision block 708. If the difference is greater than 20 feet, the Kalman filter is reset.

The present invention overcomes prior problems with utilizing KCPT technology in the aircraft carrier environment by maintaining three independent Kalman filters linked respectively to three independent ambiguity estimators. These three Kalman filters use different SVs as target SVs, which may be the first, second and third highest elevation SVs. If the Kalman filter utilizing the highest elevation SV has carrier phase measurement data that loses lock, the final KCPT solution simply implements another set of ambiguities from the Kalman filter utilizing the next highest target SV. By having three independent Kalman filters and ambiguity estimators, there will always be floating and fixed ambiguities available for the final approach solution, providing seamless operation as long as four ambiguities are available. Thus, the present invention provides an accurate solution utilizing KCPT technology in a multiple moving platform environment.

Figure 8:
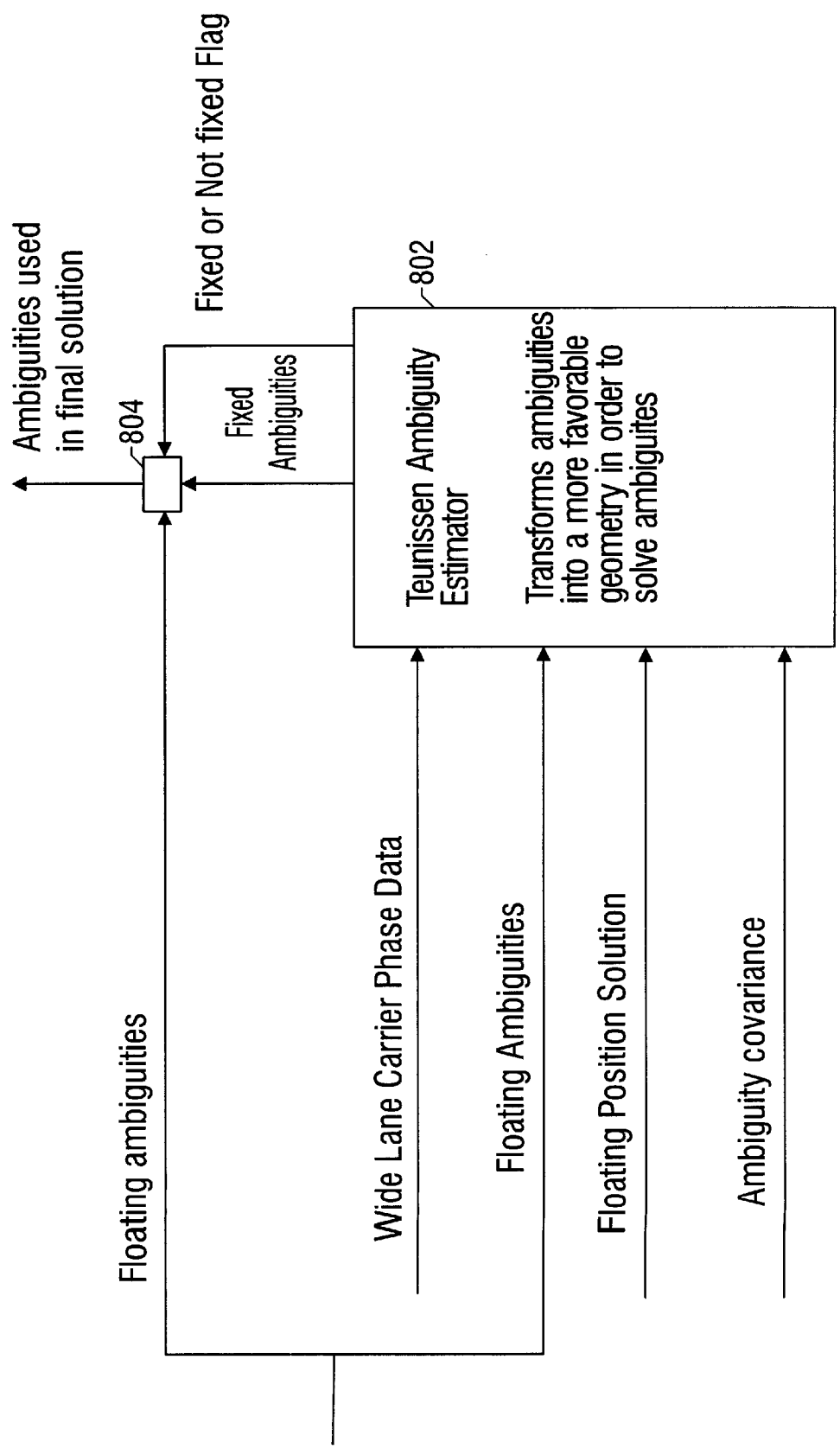
FIG. 8 is a block diagram of a Teunissen ambiguity estimator utilized by an embodiment of the present invention.

Referring to FIG. 8, a Teunissen ambiguity estimator 802 is shown that provides fixed ambiguities to processing block 804. The Teunissen ambiguity estimator 802 receives wide lane carrier phase data, floating ambiguities, floating position solution data, and ambiguity covariance data. The Teunissen ambiguity estimator 802 then transforms the ambiguities into a more favorable geometry to solve ambiguities. Processing block 804 receives floating ambiguities and a flag from the Teunissen ambiguity estimator 802 that indicates whether the ambiguities are "fixed" or "not fixed." Processing block 804 then provides fixed ambiguities for use in the final solution, if the flag indicates that the ambiguities are "fixed." Otherwise, floating ambiguities are provided for the final solution.

In general terms, the Teunissen method consists of applying a matrix transform, called a Gauss transform, to a set of double difference floating point ambiguities to decouple the statistical uncertainties in the floating point ambiguities. When successful, the algorithm reduces the covariances— not the pure variances—of the ambiguities, and the "integer least squares" estimation of the integer ambiguities becomes significantly simpler, providing the system with statistically reliable integer wavelength counts and fixed ambiguities.

Figure 9:
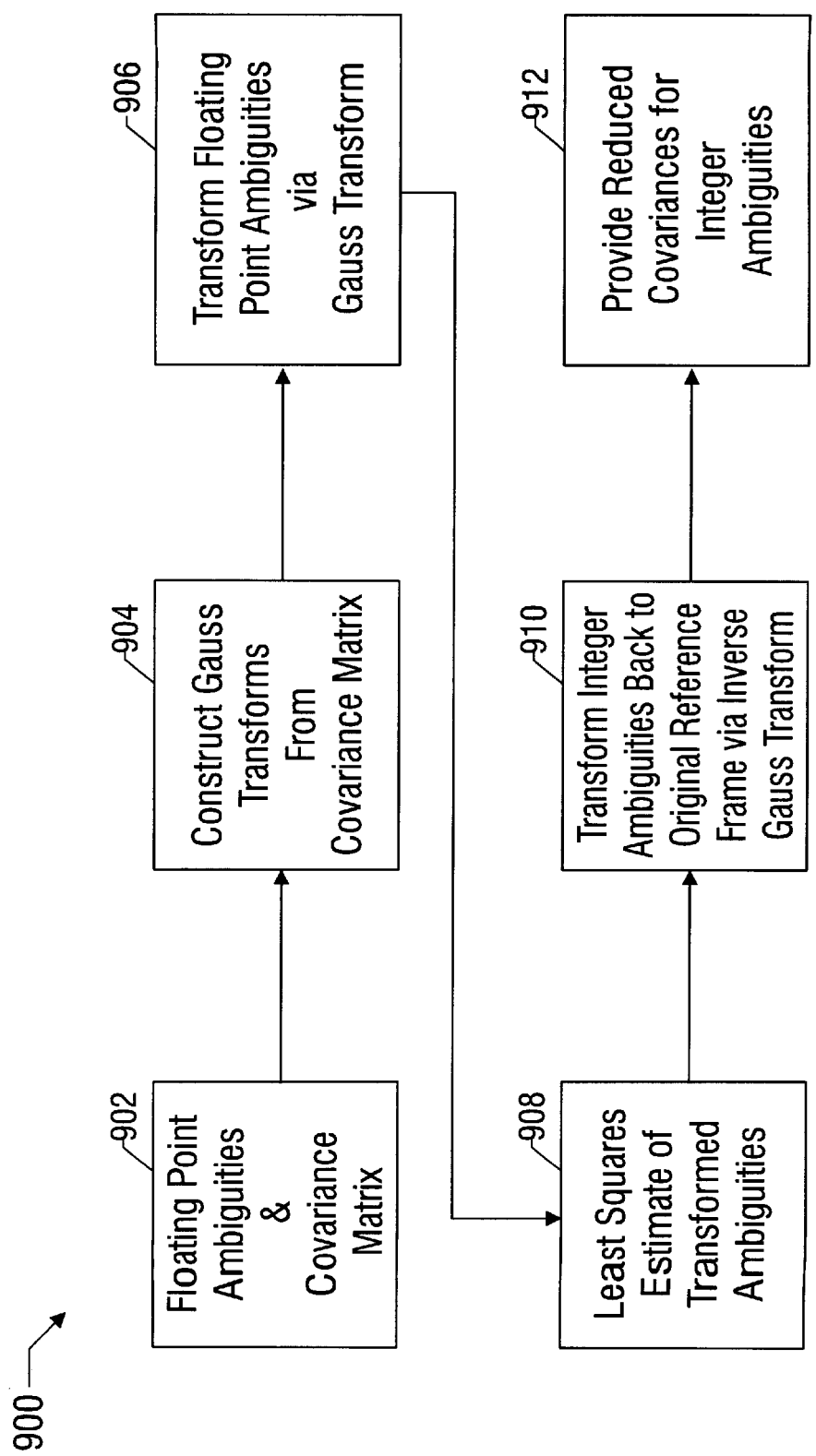
FIG. 9 is a flow chart of steps carried out by an embodiment of the present invention to implement a Teunissen ambiguity estimator.

FIG. 9 is a flow chart depicting in general terms the process 900 implemented by a Teunissen numerical ambiguity estimator. In step 902, floating point ambiguity data and covariance matrix data is received, with the covariance matrix representing the covariance states of a Kalman filter. In step 904, a Gauss transform, which include only integers, is constructed from the covariance matrix. In step 906, the floating point ambiguities are transformed utilizing the Gauss transform. The Gauss transform implements the steps done in performing a Gaussian reduction on a matrix or linear system of equations. In step 908, a least squares estimate of the transformed ambiguities is calculated. In step 910, the integer ambiguities are transformed back to an original reference utilizing an inverse Gauss transform. Finally, in step 912, reduced covariance data is provided for integer ambiguities. The success of the Teunissen process 900 depends upon determining constants for the Gauss transform that produce variance terms in the transformed covariance matrix that reduce the uncertainty of the untransformed states.

For example, consider a system of just two integer ambiguity numbers. If $a_1$ and $a_2$ represent the original double difference ambiguities, then application of the simple Gauss transform:

$$\begin{bmatrix} 1 & 0 \\ \alpha & 1 \end{bmatrix}$$

produces the transformed ambiguities $\hat{a}_1$ and $\hat{a}_2$ with explicit representation give by $\hat{a}_1 = a_1$ $\hat{a}_2 = \alpha a_1 + a_2$.

The Teunissen algorithm applies "integer least squares" estimation to this linear combination of the original ambiguities. This operation proves successful if the transformed ambiguities, $\hat{a}_1$ and $\hat{a}_2$, possess less statistical uncertainty, as indicated by their covariances, than the original ambiguities, $\hat{a}_1$ and $\hat{a}_2$. In that case, the problem of estimating the transformed ambiguities is more straightforward. (In fact, one important step in the Teunissen process becomes the determination of the integer constant, $\alpha$, for the transformation so that these covariances reduce.) This process tends to succeed because some of the double difference ambiguities have less uncertainty than others. The Gauss transform (properly determined) uses the more certain ambiguities to assist in the determination of the more uncertain ambiguities. Differing geometries of the satellites relative to the ground receiver produce more or less uncertainty in the estimation of the double difference wavelength ambiguities.

To retrieve the estimates of $a_1$ and $a_2$ after having obtained the integer estimates of $\hat{a}_1$ and $\hat{a}_2$, the inverse of the Gauss transform is applied, which in the above example has the form $$\begin{bmatrix} 1 & 0 \\ -\alpha & 1 \end{bmatrix}$$

or in explicit form $a_1 = \hat{a}_1$ $a_2 = -\alpha \hat{a}_1 + \hat{a}_2$.

The whole process provides a "generalized" rounding algorithm producing integer ambiguity estimates from the input floating point ambiguities in such a way as to reduce their uncertainties. In many cases, the algorithm may output some of the same integer ambiguities as would a simple rounding operation performed on the original floating point ambiguities, but even in those cases, increased statistical confidence in the results is provided by performing the Teunissen procedure.

The Gauss transform applied in step 904 implements steps used in performing Gaussian reduction on a matrix or linear system of equations. To reduce the matrix $$\begin{bmatrix} a_{11} & a_{12} & a_{13} & a_{14} \\ a_{21} & a_{22} & a_{23} & a_{24} \\ a_{31} & a_{32} & a_{33} & a_{34} \\ a_{41} & a_{42} & a_{43} & a_{44} \end{bmatrix}$$

to upper triangular form $$\begin{bmatrix} a_{11} & a_{12} & a_{13} & a_{14} \\ 0 & b_{22} & b_{23} & b_{24} \\ 0 & 0 & b_{33} & b_{34} \\ 0 & 0 & 0 & b_{44} \end{bmatrix}$$

one does so by adding multiples of row 1 to rows 2, 3 and 4 to get 0 in the first column, then adding multiples of row 2 to rows 3 and 4 to get 0 in the second column, and finally, adding a multiple of row 3 to row 4 to get the 0 in the (4,3) position. This has representation as the matrix operation of multiplying on the left by the matrix $$\begin{bmatrix} 1 & 0 & 0 & 0 \\ \alpha & 1 & 0 & 0 \\ \beta & \delta & 1 & 0 \\ \gamma & \varepsilon & \phi & 1 \end{bmatrix}$$

The Greek symbols represent the multiples of the rows added to other rows to produce the zeros beneath the main diagonal; for example, $\alpha$ times the first row of the original added to the second row produces the 0 in the (2,1) position. Note that this reduction leaves the first row unchanged. The above matrix forms the Gauss transform discussed in the Teunissen article mentioned above.

If the original matrix provides symmetry (i.e., self-transpose or self-adjoint, if complex), then multiplying the triangular matrix, $$\begin{bmatrix} a_{11} & a_{12} & a_{13} & a_{14} \\ 0 & b_{22} & b_{23} & b_{24} \\ 0 & 0 & b_{33} & b_{34} \\ 0 & 0 & 0 & b_{44} \end{bmatrix}$$

on the right by the transpose of the Gauss transform, $$\begin{bmatrix} 1 & \alpha & \beta & \gamma \\ 0 & 1 & \delta & \varepsilon \\ 0 & 0 & 1 & \phi \\ 0 & 0 & 0 & 1 \end{bmatrix}$$

produces a diagonal matrix, $$\begin{bmatrix} a_{11} & 0 & 0 & 0 \\ 0 & c_{22} & 0 & 0 \\ 0 & 0 & c_{33} & 0 \\ 0 & 0 & 0 & c_{44} \end{bmatrix}$$

This last matrix has the same determinant as the first.

If the original matrix represents the covariances of the states of a Kalman filter, then the last matrix represents the covariances of those states when transformed (multiplied on the left) by the matrix $$\begin{bmatrix} 1 & 0 & 0 & 0 \\ \alpha & 1 & 0 & 0 \\ \beta & \delta & 1 & 0 \\ \gamma & \varepsilon & \phi & 1 \end{bmatrix}$$

The success of implementing the Teunissen process depends upon finding constants for this matrix which produce terms on the main diagonal (variances) for the "transformed" covariance matrix that reduce the uncertainty of the untransformed states.

The Teunissen process does not produce a diagonal covariance matrix. Rather, because the process objective is to produce integer ambiguities, the Gauss transform consists only of integers. Thus, achieving zero off-diagonal elements in the transformed covariance matrix is generally not possible. The process will, however, reduce the off-diagonal elements, particularly in the case of large cross-correlation between pairs of ambiguities.

To implement a Teunissen process, the smallest diagonal element (variance) in the input covariance matrix may first be identified. The next step is to reorder the Gauss transform filter states so as to make this smallest variance the (1,1) term, or, $a_{11}$. The constants for the Gauss transform in the first column are then determined by the equation $$a_{j1} = a_{j1}/a_{11}$$

These constants are then used to perform row reduction on the covariance matrix. This procedure is then repeated using the submatrix formed by the $2^{nd}$ to $n^{th}$ rows and columns, then using the submatrix of $3^{rd}$ to $n^{th}$ rows and columns, and so on, until the covariance matrix has an upper triangular shape. The exact Gauss Transform—that is, a lower triangular matrix which achieves the same row reduction by left multiplication of the original covariance matrix—may then be determine, for example, in the following two ways.

One way is to simultaneously perform the indicated row reduction operations on an identity matrix of the same size as the covariance matrix. As the covariance matrix becomes an upper triangular, the "identity" matrix becomes transformed into a lower triangular Gauss transform. This first method may be efficiently programmed using a procedural language such as C++. Another way is to retain the row reduction constants and build the Gauss transform as the result of a sequence of matrix multiplications. The first matrix may be an identity matrix with the first column terms replaced by the constants $a_{j1}$. One multiplies this matrix on the left by an identity matrix with the second column replaced similarly by the constants $a_{j2}$. When one repeats this procedure n–1 times, the result is the same Gauss transform as found above. This second method may be programmed using the MATLAB programming language.

The determined Gauss transform, however, will generally consist of real, not integer, entries. Thus, the last step in either of the above procedures is to round the off diagonal entries to the nearest integer. Better results may be achieved by rounding to integer values only after first determining a floating point Gauss transform. Attempting to apply rounding to the constants as they are being found, column by column, tends to generate an unstable algorithm.

Not counting interchanging rows and columns, row reduction determines the Gauss transform with $n^2-(n/2)$ operations of division and rounding. By using the smallest remaining diagonal element (variance) for the divisor, the covariance reduction for the Gauss transform may be maximized.

The Gauss transform may then be used to map the input ambiguities to a new set of ambiguities. The transformation generally requires $n^2-(n/2)$ multiplications and $[n^2+(n/2)]-1$ additions, because a triangular matrix represents the Gauss transform. The ambiguities no longer represent uncertainty in single satellite pair double differences, but linear combinations of the single pair ambiguities. These transformed ambiguities remain floating point numbers at this time, until an algorithm is applied to round them to the nearest integers.

Having done so, the Teunissen process may then invert the Gauss transform to get integer ambiguities in the normal paired satellite frame.

For this Teunissen numerical ambiguity estimator to succeed, the Gauss transform will reduce the statistical uncertainty of the ambiguities. The confidence ellipsoid determined by the covariance matrix provides a mathematical representation of the uncertainty. The corresponding ellipsoid after the Gauss transform will generally have the same volume as the original confidence ellipsoid, but it need not have the same shape. If the largest variance in the original covariance matrix exceeds the smallest variance by a large factor, then the confidence ellipsoid will tend to have a sausage shape rather than a spherical shape. This generally means that some of the ambiguities will have much more statistical uncertainty than others. The Teunissen estimator remedies this disparity if, in addition, strong cross-correlation exists between ambiguities with large uncertainty and ambiguities with small uncertainty. Essentially, the Teunissen procedure uses the cross-coupling of ambiguities as measured by covariances to reduce the uncertainty of ambiguities.

The transformed covariance matrix provides a measurement of the improved statistical uncertainty. Producing the Gauss transform partially transforms the covariance matrix. To complete the transformation one multiplies the partially transformed covariance matrix on the right by the transposed, adjoint of the triangular Gauss matrix. This need not be a matrix multiplication, but merely a repetition of the reduction to triangular form with a slight alteration. To determine the success or failure of the Teunissen procedure, statistical tests on the transformed covariance matrix may be performed.

To implement the Teunissen procedure, a straightforward statistical estimation may be utilized. The implementation accumulates transformed ambiguities over a time interval in a frequency histogram. When a given set of ambiguities became sufficiently concentrated in the frequency histogram so as to contain 60% to 80% of all the estimations, the algorithm may fix the integer ambiguities to this set. This estimation may be performed using wide lane ambiguities transformed from L1 ambiguities that results from the Teunissen procedure.

Determining a Final Relative Solution Vector

Figure 10:
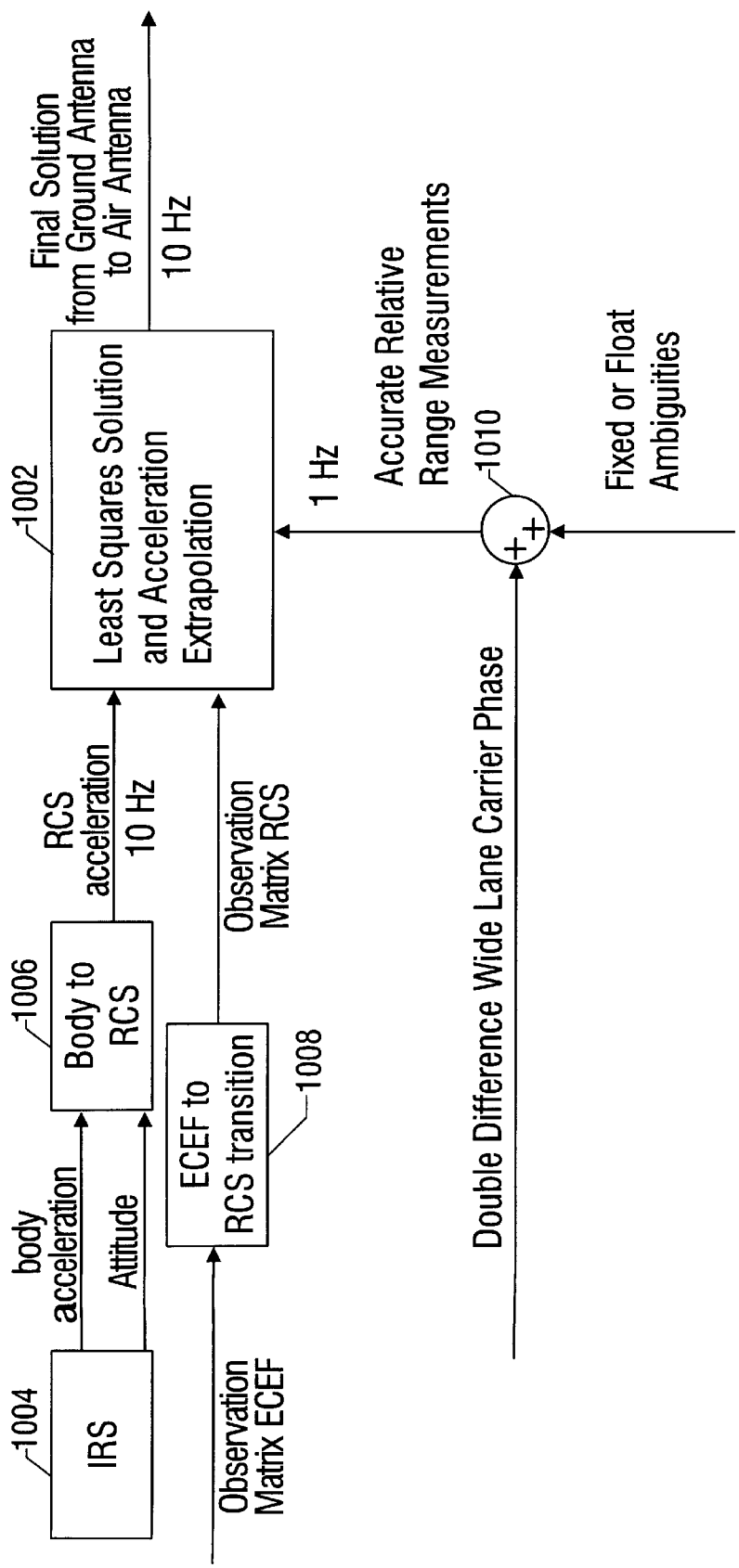
FIG. 10 is a block diagram of a least squares solution conducted by an embodiment of the present invention to determine a final solution (10 Hz) from a moving ground antenna to a moving airborne antenna.

Referring to FIG. 10, the final solution (10 Hz) processing is depicted. Processing block 1010 combines double differenced wide lane carrier phase calculations and fixed or float ambiguities to provide accurate relative range measurements (1 Hz) to processing block 1002. Inertial systems (IRS) 1004 provide body acceleration and attitude data to the Body-to-RCS processing block 1006, which in turn provides RCS (runway coordinate system) acceleration data (10 Hz) to processing block 1002. ECEF-to-RCS transition block 1008 receives observation matrix ECEF (earth centered, earth fixed) data and provides RCS observation matrix data to processing block 1002. Processing block 1002 then performs a least squares solution and acceleration extrapolation to provide a final solution (10 Hz) from the ground antenna to the airborne antenna. This final solution integrates inertial data to provide the high rate position data needed for aircraft carrier landings.

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as presently preferred embodiments. Equivalent elements or materials may be substituted for those illustrated and described herein, and certain features of the invention may be utilized independently of the use of other features, all as would be apparent to one skilled in the art after having the benefit of this description of the invention.

What is claimed is:

1. A system for determining a relative solution vector for multiple moving platforms, comprising:

a first Global Position System (GPS) receiver system associated with a first moving platform providing carrier phase tracking and pseudorange measurements with respect to a plurality of GPS satellites;

a second GPS receiver associated with a second moving platform providing carrier phase tracking and pseudorange measurements with respect to a plurality of GPS satellites;

a double differencing processor communicating with said first GPS receiver system and said second GPS receiver system to determine double differenced pseudorange and carrier phase calculations;

a plurality of independent Kalman filters communicating with said double difference processor to determine a plurality of independent sets of floating point ambiguities, each of said plurality of independent Kalman filters utilizing a different GPS satellite as a target;

a plurality of independent numerical ambiguity estimators correlated to said plurality of Kalman filters to determine a plurality of independent sets of fixed ambiguities; and a position solution processor communicating with said plurality of independent Kalman filters, said plurality of numerical ambiguity estimators, and said double differencing processor to determine a relative solution vector between said first moving platform and said second moving platform.

2. The system of claim 1, wherein said position solution processor utilizes inertial data associated with said first and said second moving platforms to provide said relative solution vector.

3. The system of claim 1, wherein said first moving platform is an aircraft carrier and said second moving platform is an aircraft.

4. The system of claim 1, wherein said plurality of Kalman filters utilize highest elevation GPS satellites as target GPS satellites.

5. The system of claim 4, wherein said position solution processor utilizes the Kalman filter from said plurality of independent Kalman filters having the highest elevation GPS satellite as a target and having carrier phase measurement data with a positive phase lock.

6. The system of claim 1, wherein said independent numerical ambiguity estimators are Teunissen ambiguity estimators.

7. The system of claim 1, having three independent Kalman filters and three correlating independent numerical ambiguity estimators.

8. A system for determining a relative solution vector for aircraft carrier approach and landing operations, comprising:

a first antenna system located on an aircraft carrier providing pseudorange and carrier phase tracking measurements from transmissions received from a plurality of positioning space vehicles;

a second antenna system located on an aircraft providing pseudorange and carrier phase tracking measurements from transmissions received from a plurality of positioning space vehicles;

a double differencing processor communicating with said first antenna system and said second antenna system to make double differenced pseudorange and carrier phase calculations;

a plurality of independent Kalman filters utilizing different target positioning space vehicles and communicating with said double differencing processor to determine a plurality of independent sets of floating ambiguities;

a plurality of independent numerical ambiguity estimators correlated to said plurality of Kalman filters to determine a plurality of independent sets of fixed ambiguities; and a position solution processor communicating with said Kalman filters, said numerical ambiguity estimators, and said double differencing processor to determine a relative solution vector between said aircraft and said aircraft carrier.

9. The system of claim 8, wherein said independent numerical ambiguity estimators are Teunissen ambiguity estimators.

10. The system of claim 9, having three independent Kalman filters and three correlating Teunissen ambiguity estimators.

11. The system of claim 10, wherein said position space vehicles are GPS satellites.

12. The system of claim 11, wherein said three independent Kalman filters utilize the three highest elevation GPS satellites as target GPS satellites.

13. An aircraft system for determining high accuracy position solutions for aircraft carrier approach and landing operations, comprising:

an antenna system constructed to receive transmissions from positioning space vehicles and make pseudorange and carrier phase tracking measurements;

a receiver system constructed to communicate with a remote transmitter to receive pseudorange and carrier phase tracking measurements with respect to said positioning space vehicles and a remote platform;

a double differencing processor communicating with said antenna system and said receiver system to make double difference pseudorange and carrier phase calculations;

a plurality of independent Kalman filters utilizing different target positioning space vehicles and communicating with said double differencing processor to determine a plurality of independent sets of floating ambiguities;

a plurality of independent numerical ambiguity estimators correlated to said plurality of Kalman filters to determine a plurality of independent sets of fixed ambiguities; and a position solution processor communicating with said Kalman filters, said numerical ambiguity estimators, and said double differencing processor to determine a relative solution vector between said aircraft and said aircraft carrier.

14. The aircraft system of claim 13, wherein said independent numerical ambiguity estimators are Teunissen ambiguity estimators.

15. The aircraft system of claim 14, having three independent Kalman filters and three correlating Teunissen ambiguity estimators.

16. A method for determining a relative solution vector between multiple moving platforms, comprising:

making pseudorange and carrier phase tracking measurements with respect to a plurality of visible positioning space vehicles and a first moving platform;

making pseudorange and carrier phase tracking measurements with respect to a plurality of visible positioning space vehicles and a second moving platform;

making double differenced pseudorange and carrier phase calculations from said pseudorange and carrier phase tracking measurements;

resolving a plurality of independent sets of floating ambiguities utilizing a plurality of independent Kalman filters;

resolving a plurality of independent sets of fixed ambiguities utilizing a plurality of Teunissen numerical ambiguity estimators correlated to said plurality of independent Kalman filters; and determining a relative solution vector between said first platform and said second moving platform.

17. The method of claim 16 further determining an intermediate relative solution vector from said double differenced calculations prior to said resolving steps.

18. The method of claim 16 for determining a relative solution vector, wherein said step of resolving floating ambiguities comprises:

resolving a first set of floating ambiguities with a first independent Kalman filter that utilizes a highest elevation positioning space vehicle as a target;

resolving a second set of floating ambiguities with a second independent Kalman filter that utilizes a second highest elevation positioning space vehicle as a target;

resolving a third set of floating ambiguities with a third independent Kalman filter that utilizes a third highest elevation positioning space vehicle as a target; and selecting a set of resolved floating ambiguities from said first independent Kalman filter if said first independent Kalman filter carrier phase measurement data has a positive phase lock, from said second independent Kalman filter if said first independent Kalman filter carrier phase measurement data does not have a positive phase lock, and from said third independent Kalman filter if said first and second independent Kalman filter carrier phase measurement data does not have a positive phase lock.

19. The method of claim 16 for determining a relative solution vector, wherein said first moving platform is an aircraft carrier and said second moving platform is an aircraft.

20. The method of claim 16 for determining a relative solution vector, wherein said positioning space vehicles are Global Positioning System satellites.

* * * * *

UNITED STATES PATENT AND TRADEMARK OFFICE
CERTIFICATE OF CORRECTION

PATENT NO. : 5,991,691
DATED : November 23, 1999
INVENTOR(S) : Gregory Bengt Johnson Page 1 of 1

It is certified that error appears in the above-identified patent and that said Letters Patent is hereby corrected as shown below:

Title page,
Item [56], References Cited, please add:

| -- 5,202,829 | 4/1993 | Geier | 364/449 |
| 5,296,861 | 3/1994 | Knight | 342/357 |
| 5,311,194 | 5/1994 | Brown | 342/357 |
| 5,451,964 | 9/1995 | Babu | 342,357 |
| 5,467,282 | 11/1995 | Dennis | 364/449 |
| 5,534,875 | 7/1996 | Diefes, et al. | 342/357 |
| 5,548,293 | 8/1996 | Cohen | 342/357 |
| 5,148,179 | 9/1992 | Allison | |
| 5,359,332 | 10/1994 | Allison et al. | |
| 5,442,363 | 8/1995 | Remondi | |
| 5,602,741 | 2/1997 | Talbot et al. | |

Cohen et al., "Real-Time Cycle Ambiguity Resolution Using a Pseudolite for Precision Landing of Aircraft with GPS," *Second International Symposium on Differential Satellite Navigation Systems,* Amsterdam, The Netherlands, March 30-April 2, 1993
Diggle, David W., "An Investigation into the Use of Satellite-Based Positioning Systems for Flight Reference/Autoland Operations," Dissertation for the Department of Electrical and Computer Engineering and the College of Engineering and Technology, Ohio University Teunissen, P.J.G., "A New Method for Fast Carrier Phase Ambiguity Estimation" *IEEE,* 562-573 (1994). --

Signed and Sealed this

Thirtieth Day of April, 2002

*Attest:*

*Attesting Officer*

JAMES E. ROGAN
*Director of the United States Patent and Trademark Office*